United States Patent
Lee et al.

(10) Patent No.: US 10,069,157 B2
(45) Date of Patent: Sep. 4, 2018

(54) FUEL CELL SYSTEM HAVING VALVE MODULE BETWEEN FUEL CELL STACK AND HUMIDIFIER

(71) Applicant: HYUNDAI MOTOR COMPANY, Seoul (KR)

(72) Inventors: Jung Jae Lee, Gimpo-si (KR); Sung Gone Yoon, Suwon-si (KR); Sae Hoon Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 354 days.

(21) Appl. No.: 14/954,471

(22) Filed: Nov. 30, 2015

(65) Prior Publication Data
US 2016/0344046 A1   Nov. 24, 2016

(30) Foreign Application Priority Data

May 18, 2015 (KR) .................. 10-2015-0068670

(51) Int. Cl.
| | |
|---|---|
| H01M 8/06 | (2016.01) |
| H01M 8/04223 | (2016.01) |
| H01M 8/04119 | (2016.01) |
| H01M 8/04228 | (2016.01) |
| H01M 8/04225 | (2016.01) |

(52) U.S. Cl.
CPC ... *H01M 8/04253* (2013.01); *H01M 8/04126* (2013.01); *H01M 8/04225* (2016.02); *H01M 8/04228* (2016.02); *H01M 8/04231* (2013.01); *H01M 2250/20* (2013.01); *Y02T 90/32* (2013.01)

(58) Field of Classification Search
CPC ......... H01M 8/04253; H01M 8/04225; H01M 8/04228; H01M 8/04126; H01M 8/04231; H01M 2250/20; Y02T 90/32
See application file for complete search history.

(56) References Cited

FOREIGN PATENT DOCUMENTS

| | | | | |
|---|---|---|---|---|
| JP | 2002-343398 | * | 11/2002 | .............. H01M 8/04 |
| JP | 2002-343398 | A | 11/2002 | |
| JP | 2006-269355 | A | 10/2006 | |
| JP | 2006286409 | A | 10/2006 | |
| JP | 2007-095450 | A | 4/2007 | |
| JP | 2008-053112 | A | 3/2008 | |
| JP | 2008-226520 | A | 9/2008 | |
| JP | 2011-066011 | A | 3/2011 | |

(Continued)

*Primary Examiner* — Raymond Alejandro
(74) *Attorney, Agent, or Firm* — McDermott Will & Emery LLP

(57) ABSTRACT

A fuel cell system includes an air supply unit for supplying air containing oxygen to a fuel cell stack. A humidifier humidifies the supplied air. An air supply line is connected between a cathode inlet of the fuel cell stack and the humidifier to supply the humidified air to the fuel cell stack. A cathode-side exhaust line is connected between a cathode outlet of the fuel cell stack and the humidifier to supply a cathode exhaust gas discharged from a cathode of the fuel cell stack to the humidifier for humidification in the humidifier. A unified valve module includes a bypass line connected between the air supply line and the cathode-side exhaust line and an outward discharge port discharging the cathode exhaust gas to outside, and controls a gas flow between the humidifier and the fuel cell stack and between the bypass line and the outward discharge port.

11 Claims, 7 Drawing Sheets

(56) References Cited

FOREIGN PATENT DOCUMENTS

| KR | 10-2006-0130957 A | 12/2006 |
| KR | 10-2008-0048077 A | 5/2008 |
| KR | 10-2010-0136716 A | 12/2010 |
| KR | 10-2012-0061664 A | 6/2012 |

* cited by examiner

-- PRIOR ART --

-- PRIOR ART --

FUEL CELL SYSTEM HAVING VALVE MODULE BETWEEN FUEL CELL STACK AND HUMIDIFIER

CROSS-REFERENCE TO RELATED APPLICATION

This application claims under 35 U.S.C. § 119(a) the benefit of priority to Korean Patent Application No. 10-2015-0068670 filed on May 18, 2015, the entire contents of which are incorporated herein by reference.

TECHNICAL FIELD

The present disclosure relates to a fuel cell system. More particularly, the present disclosure relates to a safe fuel cell system satisfying Global Technical Regulations (GTRs) in an operation range thereof without a risk of fire.

BACKGROUND

A fuel cell system for an environmentally friendly hydrogen fuel cell vehicle includes a fuel cell stack generating electrical energy through an electrical chemical reaction of reactive gas. A hydrogen supplier supplies fuel gas, that is, hydrogen, to the fuel cell stack. An air supplier supplies air containing oxidizing gas, that is, oxygen. A heat and water management system controls an operation temperature of the fuel cell stack, and performs a water management function. A fuel cell system controller controls the overall operation of the fuel cell system.

FIG. 1 is a diagram illustrating a configuration of a general fuel cell system. In a fuel cell system, a hydrogen supplier thereof includes a hydrogen storage (hydrogen tank) 21, a hydrogen supply line 22, a regulator (not shown), a hydrogen pressure control valve 23, and a hydrogen re-circulator. An air supplier of the fuel cell system includes an air blower 33 and a humidifier 34. A heat and water management system (not shown) of the fuel cell system includes a water trap, a motor-driven water pump (cooling water pump), a water tank, a radiator, etc.

High-pressure hydrogen supplied from the hydrogen tank 21 of the hydrogen supplier is supplied to the fuel cell stack 10 after being pressure-reduced to a predetermined pressure in the regulator (not shown) by the hydrogen pressure control valve 23 at an inlet side of a cathode. In this case, the pressure-reduced hydrogen is supplied to the fuel cell stack while controlling amount thereof through pressure control according to operation conditions of the fuel cell stack 10.

That is, the hydrogen passing through the regulator after being supplied from the hydrogen tank 21 is supplied to the fuel cell stack 10 after being pressure-controlled by the hydrogen pressure control valve 23 at the inlet side of the cathode. The hydrogen pressure control valve 23 adjusts hydrogen pressure-reduced by the regulator to a pressure appropriate for a stack operation condition.

In the hydrogen re-circulator, an ejector or re-circulation blower 25 is connected to a re-circulation line 24 at an anode of the fuel cell stack 10 to re-circulate unreacted hydrogen, which is not used by the anode of the fuel cell stack 10, and to re-use of hydrogen.

The air supplier humidifies air supplied by the air blower 33 through the humidifier 34, and then supplies the humidified air to the fuel cell stack 10 via an air supply line 35.

Nitrogen contained in the air supplied to the cathode of the fuel cell stack 10 in accordance with the operation of the fuel cell stack 10 and water (water and vapor) produced at the cathode of the fuel cell stack 10 pass through an electrolytic membrane disposed in the fuel cell stack 10, and then move to the anode of the fuel cell stack 10.

The nitrogen reduces a partial pressure of the oxygen, thereby degrading the performance of the fuel cell stack 10. The produced water blocks a flow channel of a separation plate channel, thereby restricting movement of the hydrogen. As the amount of the foreign matters, e.g. nitrogen, water, and water vapor fed to the anode through the electrolytic membrane within the fuel cell stack 10 increases, the amount of hydrogen at the anode is reduced, and thus, reaction efficiency decreases.

Therefore, it is necessary to remove nitrogen from crossing-over air and liquid droplets in the channel through periodic purging of the anode in order to secure stable performance of the fuel cell stack 10.

That is, a purge valve 40 is connected to an outlet line of the anode of the fuel cell stack 10, for purge of hydrogen. The hydrogen purge is performed by periodically opening the purge valve 40 at intervals of a predetermined period during travel of the vehicle in order to increase purity of hydrogen in the fuel cell stack 10. The purge valve 40 is also opened to purge the hydrogen in the fuel cell stack 10 upon shutdown (start-off) of the fuel cell system or start-up of the fuel cell system. In this case, the purged hydrogen is exhausted outwards through an exhaust line 41 at an outlet side of the anode in the fuel cell stack 10, exhaust lines 36 and 37 at the side of the cathode, and humidifier 34.

As the hydrogen from the anode is periodically exhausted, foreign matters such as nitrogen or moisture is removed from the separation plate channel in the fuel cell stack 10 through exhaust thereof. Accordingly, it may be possible to achieve an increase in hydrogen concentration and hydrogen use rate, and an enhancement in gas diffusion and reactivity.

The purge valve 40 is an electromagnetic control valve, which is periodically opened or closed in accordance with a command from the fuel cell system controller (not shown) for hydrogen concentration management. When the purge valve 40 is opened, the foreign matters such as moisture or nitrogen present in the fuel cell stack 10 are discharged to the atmosphere through a vehicle exhaust port connected to the exhaust line 37.

When the purge valve 40 is opened during driving of the vehicle, the hydrogen may be exhausted to the atmosphere via the exhaust lines 36 and 37 by a pressure difference between the anode (relatively high pressure) and the cathode in the fuel cell stack 10. In this case, the foreign matters are discharged together with hydrogen, and thus, a desired output of the fuel cell stack 10 may be maintained.

FIG. 2 is a diagram of an air flow in a fuel cell system. Referring to FIG. 2, air cutoff valves 32 and 38 are installed at an air supply line 31 at an inlet side of the air blower 33 and the exhaust line 37 at an outlet side of the humidifier 34, respectively.

Humid air discharged through a cathode-side outlet of the fuel cell stack 10 and the exhaust line 36 in the configuration of FIG. 2 is exhausted outwards through the exhaust line 37 together with hydrogen discharged through the purge valve 40 after passing through the humidifier 34.

In addition, dry air supplied by the air blower 33 is humidified after receiving moisture from humid air discharged from the cathode of the fuel cell stack 10 through the exhaust line 36, and is then supplied to the cathode of the fuel cell stack 10 via the air supply line 35.

Since the air cutoff valves 32 and 38 are installed at the inlet side of the air blower 33 and the outlet side of the humidifier 34, respectively, air flows along a path including the air cutoff valve 32, air blower 33, humidifier 34, stack (cathode) 10, humidifier 34, and air cutoff valve 38.

Both air cutoff valves 32 and 38 are controlled to be in an opened state in order to allow air to flow along the above-mentioned path.

Hereinafter, problems encountered in the conventional fuel cell system will be described.

First, both air cutoff valves 32 and 38 are closed upon shutdown of the fuel cell system. In this state, hydrogen purged in accordance with the opening of the purge valve 40 is left not only in the humidifier 34 after passing through the anode-side exhaust line ("41" in FIG. 1) and the cathode-side exhaust line 36, but also in the lines 31, 35, 36, and 37 between the air cutoff valves 32 and 38, the air blower 33, the humidifier 34, and the cathode of the fuel cell stack 10.

When such air is left within the system, performance degradation and durability degradation of the fuel cell stack 10 may occur.

In fuel cell vehicles, safety may be secured without a risk of fire when the concentration of hydrogen exhausted outwards does not exceed a predetermined level. In general, the concentration of hydrogen exhausted from fuel cell vehicles is regulated to peak at 8% or less and have an average of 4% or less for 3 seconds.

In order to meet such Global Technical Regulations (GTRs) through reduction of the concentration of exhausted hydrogen, motor companies use a method in which hydrogen is accumulated in a dilution device, and is then exhausted after being diluted through injection of air or a method in which hydrogen is combusted.

However, when the time from shutdown of the fuel cell system to a next start-up is lengthened (when the shutdown time of the fuel cell stack is lengthened), there may be a phenomenon in which hydrogen in the fuel cell stack 10 crosses over the cathode through the electrolytic membrane. As degradation of the fuel cell stack 10 becomes severe, the amount of hydrogen crossing over the cathode increases.

The hydrogen purged during start-up, hydrogen crossing over the cathode through the electrolytic membrane in the fuel cell stack 10, and hydrogen accumulated in the humidifier during shutdown are ejected by air supplied from the air blower 33, and thus, are exhausted through the exhaust line 37. In this case, hydrogen is pushed into the exhaust line 37 without being mixed with air, thus, increasing the concentration of hydrogen and a fire risk. Furthermore, it may be impossible to meet Global Technical Regulations (GTRs).

In conventional cases, a reduction in hydrogen concentration is achieved through change of software in a controller. However, such hydrogen concentration reduction has limitations. When degradation of a stack becomes severe, a phenomenon in which hydrogen in the fuel cell stack 10 penetrates into a cathode increases, and thus, the concentration of hydrogen exhausted outwards increases. Furthermore, it may be impossible to meet the desired regulations.

When shutdown (start-off) occurs at ambient temperature of 5° C. or less, the air blower 33 is driven to discharge water in the fuel cell stack 10 to the exhaust lines 36 and 37 in order to prevent water in the fuel cell stack 10 from freezing. Thus, a cold start at a temperature below the freezing point of water in winter may be achieved.

In this case, a portion of water discharged from the fuel cell stack 10 is fed back to the fuel cell stack 10, and thus, efficient water removal may not be achieved. When residual water in the fuel cell stack 10 freezes in winter, a start-up time taken for the cold start may increase or a start-up failure may occur.

SUMMARY OF THE DISCLOSURE

The present disclosure has been made in an effort to solve the above-described problems associated with prior art.

An aspect of the present inventive concept provides a safety fuel cell system satisfying Global Technical Regulations (GTRs) in an operation range thereof irrespective of a degraded state of a fuel cell stack without a risk of fire.

Another aspect of the present inventive concept provides a fuel cell system preventing performance degradation and durability degradation of a fuel cell stack caused by air left after shutdown of the fuel cell system.

Still another aspect of the present inventive concept provides a fuel cell system solving problems associated with a cold start, delay of a cold start-up time, and freezing of an air cutoff valve due to freezing of water in winter.

According to an embodiment the present inventive concept, a fuel cell system includes an air supply unit for supplying air containing oxygen as an oxidizing gas to a fuel cell stack. A humidifier humidifies the air supplied by the air supply unit. An air supply line is connected between a cathode inlet of the fuel cell stack and the humidifier and supplies the humidified air to the fuel cell stack. A cathode-side exhaust line is connected between a cathode outlet of the fuel cell stack and the humidifier and supplies a cathode exhaust gas discharged from a cathode of the fuel cell stack to the humidifier for humidification in the humidifier. A unified valve module is connected to the air supply line and the cathode-side exhaust line and includes a bypass line connected between the air supply line and the cathode-side exhaust line and an outward discharge port discharging the cathode exhaust gas to outside to control a gas flow between the humidifier and the fuel cell stack and between the bypass line and the outward discharge port.

The unified valve module may include a first valve installed at the air supply line and a second valve installed at the cathode-side exhaust line. The bypass line connects the first valve and the second valve, and the outward discharge port is provided at the second valve. The first valve may selectively open and close a first supply line of the air supply line connected to an outlet of the humidifier, a second supply line of the air supply line connected to the cathode inlet of the fuel cell stack and the bypass line. The second valve may selectively open and close a first exhaust line of the cathode-side exhaust line connected to the cathode outlet of the fuel cell stack, a second exhaust line of the cathode-side exhaust line connected to an inlet of the humidifier, the bypass line, and the outward discharge port.

Each of the first and second valves may be an electromagnetic valve, an opening or closing operation of which is independently controlled in accordance with a control signal from a controller.

Each of the first and second valves may include a valve housing, to which the first and second supply lines and the first and second exhaust lines are connected. A valve body is installed in the valve housing to selectively open and close the first and second supply lines and the first and second exhaust lines connected to the valve housing in accordance with a rotational operation of the valve body. valve actuators rotate the valve body accordance with a control signal from a controller to selectively open and close the first and second supply lines and the first and second exhaust lines.

The first and second valves may have an integrated valve structure in which the valve housings of the first and second valves are integrally connected.

An anode-side exhaust line of the fuel cell stack, at which a purge valve is installed, may be connected to the first exhaust line, to guide purged hydrogen to flow to the first exhaust line during the opening of the purge valve.

In a normal operation mode of the fuel cell system in which the air supplied by the air supply unit is supplied to the fuel cell stack after being humidified by the cathode exhaust gas in the humidifier, the first valve may close the bypass line while opening the first and second supply lines. The second valve may close the bypass line and the outward discharge port while opening the first and the second exhaust lines, under a condition that the air supply unit is driven.

In a start-up mode in which start-up of the fuel cell system is executed, the first valve may open the first supply line, the second supply line, and the bypass line. The second valve may close the outward discharge port while opening the first exhaust line, the second exhaust line, and the bypass line, under a condition that the air supply unit is driven, to discharge hydrogen present in the cathode of the fuel cell stack and the cathode-side exhaust line to the outside via the humidifier and an exhaust line connected to the outlet of the humidifier after being diluted with the air supplied by the air supply unit.

The start-up mode may include a first control operation mode, and a second control operation mode to be executed after execution of the first control operation mode. In the first control operation mode, the first valve may close the second supply line while opening the first supply line and the bypass line, and the second valve may close the first exhaust line and the outward discharge port while opening the second exhaust line and the bypass line, under a condition that the air supply unit is driven. In the second control operation mode, the first valve may open the first supply line, the second supply line, and the bypass line, and the second valve may close the outward discharge port while opening the first exhaust line, the second exhaust line, and the bypass line, under a condition that the air supply unit is driven.

In a shutdown state of the fuel cell system, the first valve may close the second supply line, and the second valve may close the first exhaust line.

Under a low temperature condition in which ambient temperature detected by a temperature sensor in a vehicle during shutdown of the fuel cell system is equal to or lower than a reference temperature, a humidifier bypass mode may be executed in which the first valve closes the bypass line while opening the first supply line and the second supply line. The second valve closes the second exhaust line and the bypass line while opening the first exhaust line and the outward discharge port, under a condition that the air supply unit drives, to discharge the air supplied by the air supply unit to the outside through the outward discharge port while bypassing the humidifier after passing through the cathode of the fuel cell stack.

The humidifier bypass mode may be executed for a predetermined period of time. After execution of the humidifier bypass mode, in a state where the operation of the air supply unit is stopped, a shutdown mode may be executed in which the first valve closes the second supply line, and the second valve closes the first exhaust line.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

FIGS. 4, 5A, 5B, 6, and 7 are views illustrating valve states according to a control mode of the unified valve module according to an embodiment of the present inventive concept, wherein FIG. 4 is a view illustrating valve states according to a normal control mode, FIG. 5A is a view illustrating valve states according to a first step of a start-up mode, FIG. 5B is a view illustrating valve states according to a second step of the start-up mode, FIG. 6 is a view illustrating valve states according to a shutdown mode, and FIG. 7 is a view illustrating valve states according to a humidifier bypass mode.

Figure 1:
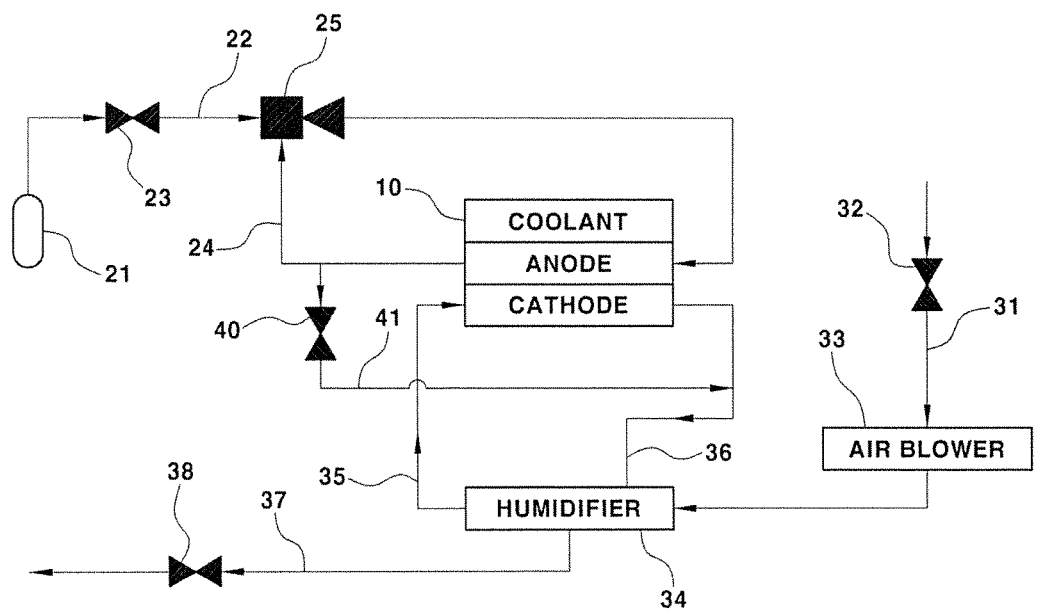
FIG. 1 is a diagram illustrating a configuration of a general fuel cell system.
Figure 2:
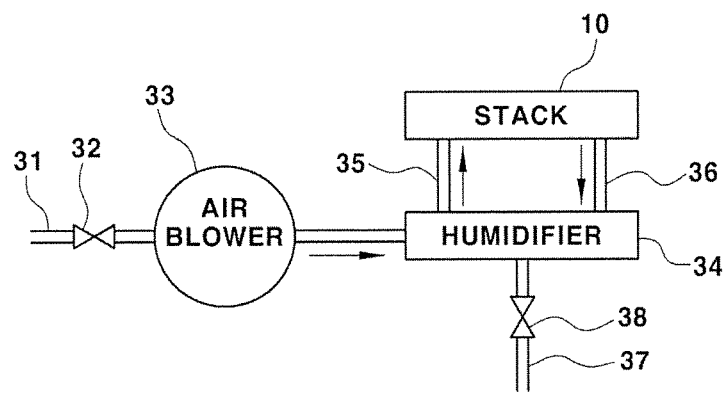
FIG. 2 is a diagram of an air flow in the general fuel cell system.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present inventive concept, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 3:
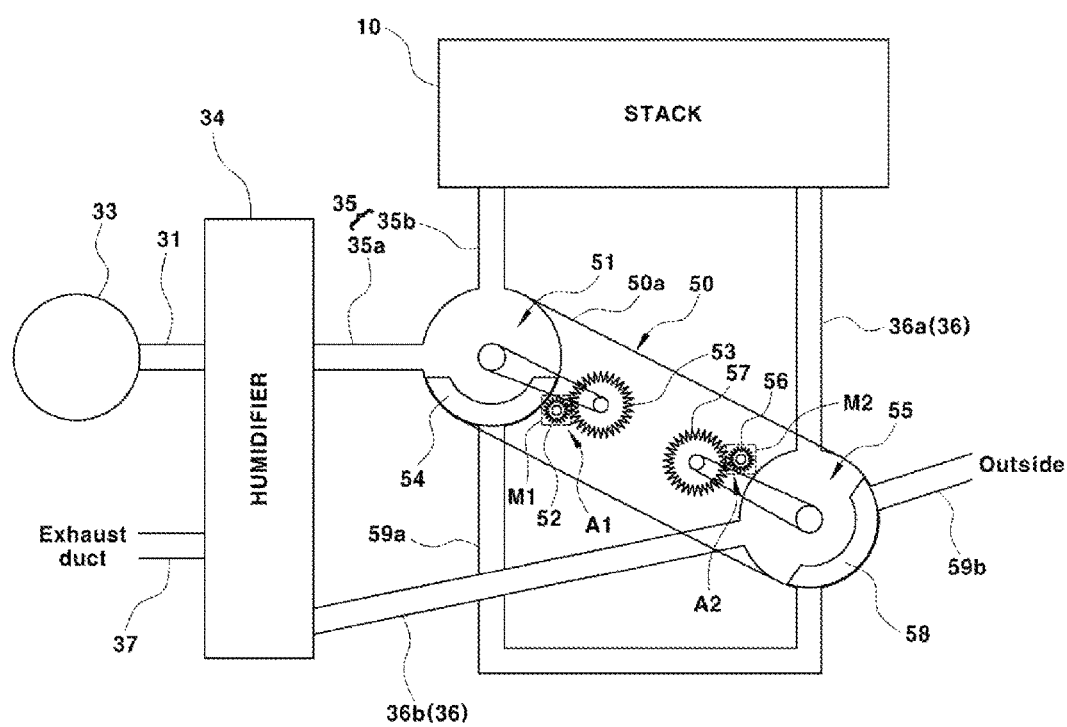
FIG. 3 is a view illustrating a fuel cell system according to an embodiment of the present inventive concept in which a unified valve module is installed.

FIG. 3 is a view illustrating a fuel cell system according to an embodiment of the present inventive concept in which a unified valve module is installed.

As illustrated in FIG. 3, a unified valve module 50 is installed between an air supply line 35 and a stack cathode-side exhaust line 36, which connect a fuel cell stack 10 and a humidifier 34.

The air supply line 35 is a line, along which dry air from an air blower 33 as an air supply unit (ASU) is supplied to the fuel cell stack 10 after receiving moisture from the humidifier 34. The cathode-side exhaust line 36 is a line, along which cathode exhaust gas, namely, humid air, exhausted through a cathode outlet of the fuel cell stack 10 is supplied to the humidifier 34, for exchange of moisture with dry air.

An anode-side exhaust line 41 of the fuel cell stack 10, at which a purge valve 40 is installed, as shown in FIG. 1, is connected to the cathode-side exhaust line 36 and thus, purged hydrogen flows to the cathode-side exhaust line 36 when the purge valve 40 is opened.

The unified valve module 50 has a unified module configuration including a bypass line 59a to connect the air supply line 35 and the cathode-side exhaust line 36, and first and second valves 51 and 55 connected by the bypass line 59a.

Here, the first valve 51 may be arranged at an intermediate portion of the air supply line 35. The second valve 55 may be arranged at an intermediate portion of the cathode-side exhaust line 36.

Referring to FIG. 3, the first valve 51, which is of a 3-way valve, is installed at the air supply line 35 to connect an outlet of the humidifier 34 and a cathode inlet of the fuel cell stack 10. The second valve 55, which is of a 4-way valve, is installed at the cathode-side exhaust line 36 to connect the cathode outlet of the fuel cell stack 10 and the inlet of the humidifier 34.

In more detail, the first valve 51 selectively opens and closes a first supply line 35a of the air supply line 35 connected to the outlet of the humidifier 34, a second supply line 35b of the air supply line 35 connected to the cathode inlet of the fuel cell stack 10, and the bypass line 59a.

The second valve 55 additionally includes an outward discharge port 59b discharging the cathode exhaust gas to outside. The second valve 55 selectively opens and closes a first exhaust line 36a of the cathode-side exhaust line 36 connected to the cathode outlet of the fuel cell stack 10, a second exhaust line 36b of the cathode-side exhaust line 36 connected to the inlet of the humidifier 34, the bypass line 59a, and the outward discharge port 59b.

Each of the first and second valves 51 and 55 is an electromagnetic valve, opening or closing operation of which is independently controlled in accordance with a control signal from a controller such as a typical electronic control unit (ECU, not shown). Each of the first and second valves 51 and 55 includes a valve housing 50a, to which the above-described lines are connected. A valve body 54 or 58 is installed in the valve housing 50a to selectively open and close lines connected to the valve housing 50a in accordance with rotational operation thereof. valve actuators (A1, A2) are driven in accordance with the control signal from the controller to rotate the valve body 54 or 58 so as to selectively open and close the lines.

In a certain embodiment, the first and second valves 51 and 55 may have an integrated valve structure in which the valve housings 50a of the first and second valves 51 and 55 are connected.

In another embodiment, the valve actuators (A1, A2) in each of the valves 51 and 55 may include motors (M1, M2), driving of which is controlled in accordance with an electrical signal output from the controller. The valve body 54 or 58 of each valve 51 or 55 is mounted in the corresponding valve housing 50a, to rotate by rotational force received from the motors (M1, M2) during the driving of the motors (M1, M2), and thus, selectively opens and closes the corresponding lines.

Constituent elements for transmitting rotational force, namely, a reduction gear to speed-reduce rotational force of the motors (M1, M2) and a power transmission mechanism to transmit the rotating force speed-reduced by the reduction gear to each valve body 54 or 58, may be interposed between a drive shaft of the motor and a rotational central shaft of the valve body 54 or 58.

In more detail, a driving gear 52 or 56 is mounted to the drive shaft of the motors (M1, M2), and a reduction gear 53 or 57 is engaged with the driving gear 52 or 56. The reduction gear 53 or 57 has more teeth than the driving gear 52 or 56. The power transmission mechanism connects a rotational shaft of the reduction gear 53 or 57 to the rotational shaft of the valve body 54 or 58 in a power transmissible manner. As the power transmission mechanism, a belt type transmission mechanism to connect pulleys of two rotational shafts by a belt or a chain type transmission mechanism to connect sprockets of two rotational shafts by a chain may be used.

The anode-side exhaust line of the fuel cell stack 10 ("41" in FIG. 1), at which the purge valve ("40" in FIG. 1) is installed, is connected to the first exhaust line 36a, and thus, purged hydrogen flows to the first exhaust line 36a when the purge valve 40 is opened.

The unified valve module 50 is controlled in accordance with the control signal output from the controller to operate in a control mode selected from a normal operation mode, a start-up mode, a shutdown mode, and a humidifier bypass mode. Here, the driving of the valve actuators (A1, A2) in each valve is controlled in accordance with the control signal from the controller, and thus, the selected control mode is executed when the corresponding valve body rotates to a predetermined position.

FIGS. 4 to 7 are views illustrating valve states according to a control mode of the unified valve module in the present disclosure.

Figure 4:
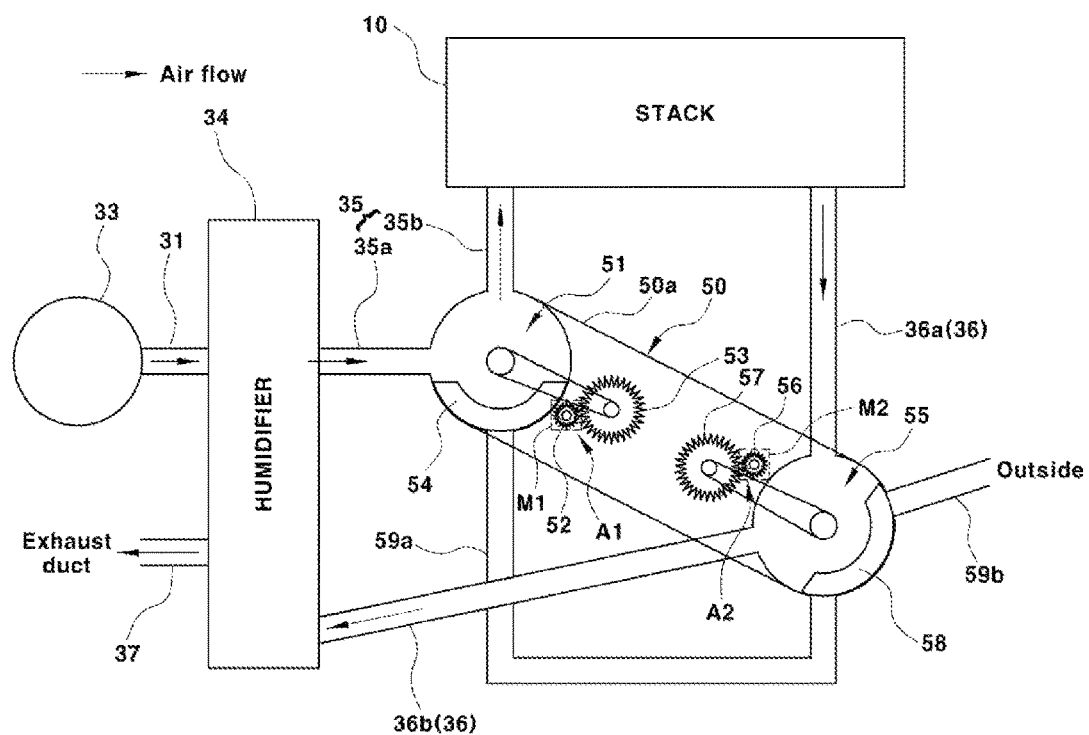

First, the normal operation mode is a control mode selected under the condition that the fuel cell system operates normally. As illustrated in FIG. 4, in the normal operation mode, the first valve 51 opens the first and second supply lines 35a and 35b while closing the bypass line 59a in accordance with a control signal from the controller. In addition, in accordance with the control signal from the controller, the second valve 55 opens the first and second exhaust lines 36a and 36b while closing the bypass line 59a and the outward discharge port 59b.

As a result, the air supplied through the air supply line 31 at an inlet side of the humidifier 34 near the air blower 33 is humidified in the humidifier 34, and is then supplied to the cathode of the fuel cell stack 10 via the first supply line 35a, first valve 51, and second supply line 35b. Air discharged from the cathode of the fuel cell stack 10 is exhausted to the outside after passing through the first exhaust line 36a, the second valve 55, the second exhaust line 36b, the humidifier 34, and an exhaust line 37 at the outlet side of the humidifier 34, together with purged hydrogen (discharged to the first exhaust line 36a via the purge valve).

Next, the start-up mode is executed upon start-up of the fuel cell system. In this mode, hydrogen present in the cathode of the fuel cell stack 10 and the exhaust line 36a is exhausted to the outside after being diluted with fresh air supplied by the air blower 33 before normal operation of the fuel cell system.

In the start-up mode, the unified valve module 50 is controlled at two steps in accordance with control signals from the controller. In the first step of the start-up mode, air discharged from the outlet of the humidifier 34 to the first air supply line 35a of the fuel cell stack 10 during driving of the air blower 33 is discharged to the exhaust line 37 after being introduced into the humidifier 34 via the first valve 51, bypass line 59a, and second valve 55, without being introduced into the fuel cell stack 10.

Figure 5A:
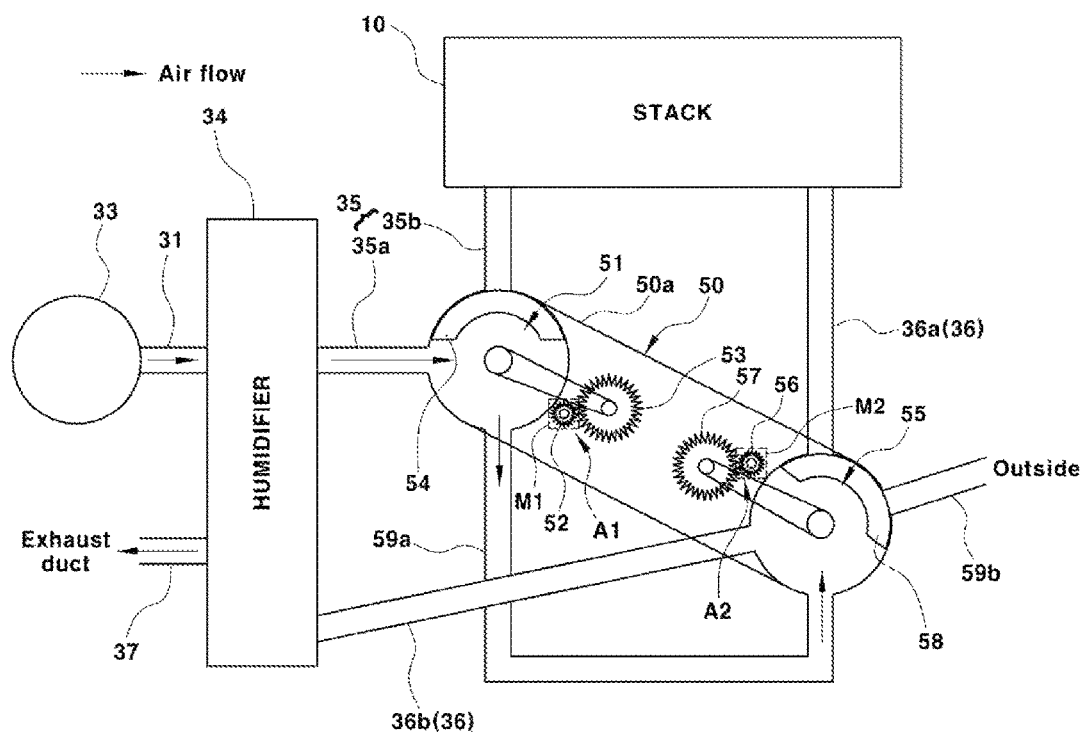

As illustrated in FIG. 5A, the first valve 51 is controlled to close the second supply line 35b while opening the first supply line 35a and bypass line 59a.

In addition, at the first step of the start-up mode, the second valve 55 closes the first exhaust line 36a and outward discharge port 59b while opening the second exhaust line 36b and bypass line 59a.

Accordingly, when the air blower 33 is driven at the first step of the start-up mode, air supplied by the air blower 33 is introduced into the humidifier 34, and is then exhausted to the outside via the exhaust line 37 at the outlet side of the humidifier 34 after passing through the first supply line 35a connected to the outlet of the humidifier 34, the first valve 51, the bypass line 59a, the second valve 55, the second exhaust line 36b, and the humidifier 34.

Thus, at the first step of the start-up mode, the air supplied by the air blower 33 passes through the humidifier 34, and is then exhausted to the outside through the exhaust line 37 after being guided to again flow through the humidifier 34 via the first valve 51 and second valve 55 without being supplied to the fuel cell stack 10. Here, no hydrogen is exhausted through the exhaust line 37.

After a predetermined time elapses, the second step of the start-up mode for control of the unified valve module 50 is executed in accordance with a control signal form the controller. At the second step of the start-up mode, hydrogen present in the cathode of the fuel cell stack 10 and the exhaust line 36a is exhausted to the outside after being diluted with fresh air supplied by the air blower 33 in the unified valve module 50 before execution of normal operation of the fuel cell system.

Figure 5B:
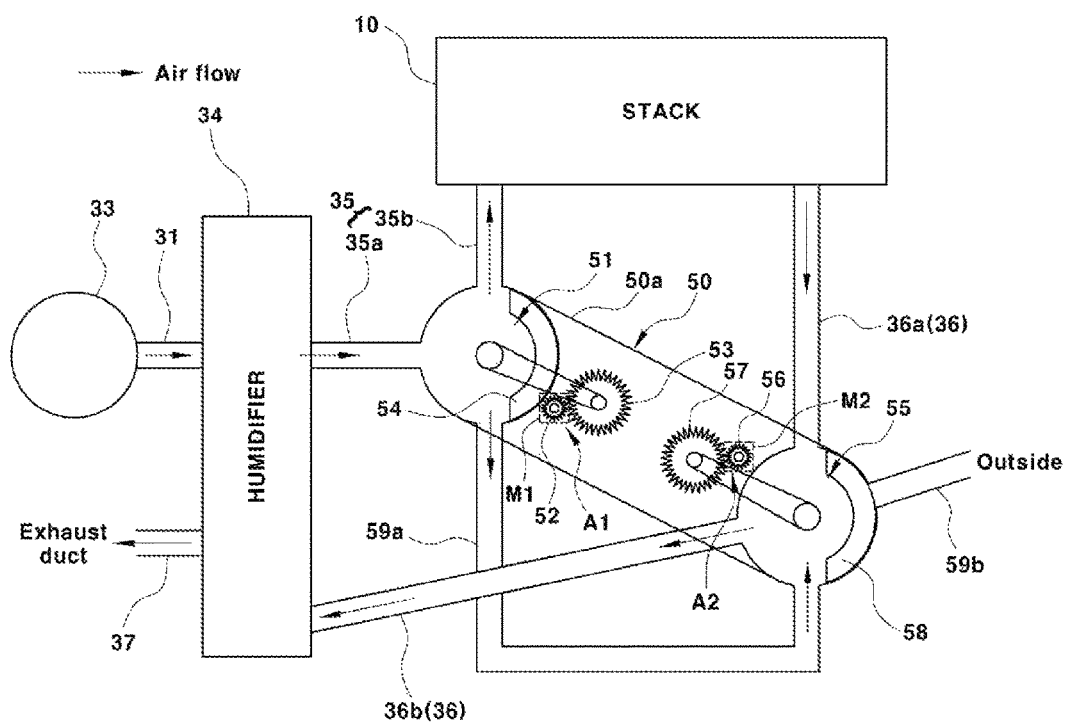

As illustrated in FIG. 5B, the first valve 51 is controlled to open the first supply line 35a, bypass line 59a, and second supply line 35b. The second valve 55 is controlled to open the first exhaust line 36a, second exhaust line 36b, and bypass line 59a while closing the outward discharge port 59b.

Accordingly, when the air blower 33 is driven at the second step of the start-up mode, the air supplied by the air blower 33 is introduced into the first valve 51 via the first air supply line 35a connected to the humidifier outlet after passing through the humidifier 34. The air introduced into the first valve 51 is distributed into the second air supply line 35b and bypass line 59a. Therefore, a portion of the air is supplied to the cathode of the fuel cell stack 10, and the remaining portion of the air is supplied to the second valve 55 via the bypass line 59a.

In addition, at the second step of the start-up mode, hydrogen present in the cathode of the fuel cell stack 10 and the first exhaust line 36a (purged hydrogen, hydrogen crossing over the anode of the fuel cell stack 10, etc.) moves to the second valve 55 by air supplied to the cathode of the fuel cell stack 10 via the second supply line 35b after being introduced into the first valve 51. The hydrogen moved to the second valve 55 is mixed with fresh air introduced into the second valve 55 via the first supply line 35a, first valve 51, and bypass line 59a, to be diluted, and is then exhausted to the outside via the second exhaust line 36b, the humidifier 34, and the exhaust line 37.

According to the present disclosure as described above, the concentration of hydrogen exhausted to the outside is reduced in accordance with fuel cell start-up and hydrogen dilution, thus satisfying Global Technical Regulations (GTRs) while reducing a risk of fire.

A control for the normal operation mode is executed after the above-described control for the start-up mode to carry out a normal operation of the fuel cell system.

Next, the shutdown mode, which is a control mode for the unified valve module, is executed upon shutdown of the fuel cell system. In this mode, the unified valve module 50 is controlled to close the cathode inlet and outlet of the fuel cell stack 10.

Figure 6:
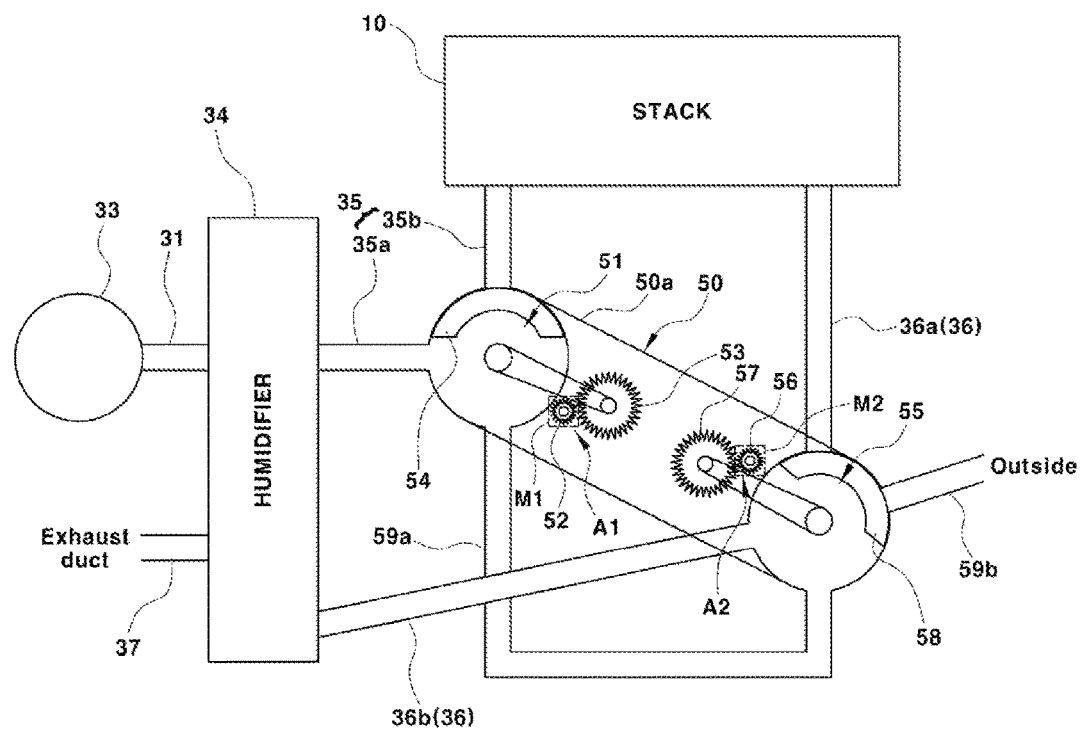

As illustrated in FIG. 6, in the shutdown mode, the first valve 51 is controlled in the same manner as at the first step of the start-up mode in accordance with a control signal from the controller.

In addition, in the shutdown mode, the second valve 55 is controlled in accordance with a control signal from the controller to open the bypass line 59a and second exhaust line 36b while closing the first exhaust line 36a and outward discharge port 59b.

The shutdown mode control is executed upon shutdown of the fuel cell system before the purge operation of the purge valve in an OFF state of the air blower 33. Accordingly, the hydrogen purged by the purge valve is present in the first exhaust line 36a upon shutdown.

In this case, the first and second valves 51 and 55 close the second air supply line 35b connected to the cathode inlet of the fuel cell stack 10 and the first exhaust line 36a connected to the cathode outlet of the fuel cell stack 10, respectively to function as conventional air cutoff valves.

In addition, in the above-described shutdown state, a small amount of air is present in the fuel cell stack 10 and lines, thus minimizing performance degradation and durability degradation of the fuel cell stack 10.

Finally, the humidifier bypass mode is executed upon shutdown of the fuel cell system under a low temperature condition wherein ambient temperature detected by a temperature sensor installed in the vehicle is equal to or lower than a reference value. That is, the humidifier bypass mode is a control mode for discharge of water present in the fuel cell stack 10 and exhaust line 36a.

In the humidifier bypass mode, the unified valve module 50 is controlled to move air supplied by the air blower 33 during driving of the air blower 33 to the cathode inlet of the fuel cell stack 10 via the humidifier 34 and the first valve 51 of the unified valve module 50 while discharging, to the outside, water present in the cathode of the fuel cell stack 10 and the first exhaust line 36a by the air supplied to the cathode of the fuel cell stack 10 through the second valve 55 of the unified valve module 50 and the outward discharge port 59b during which the water is prevented from passing through the humidifier 34 under a condition in which the bypass line 59a is closed.

Figure 7:
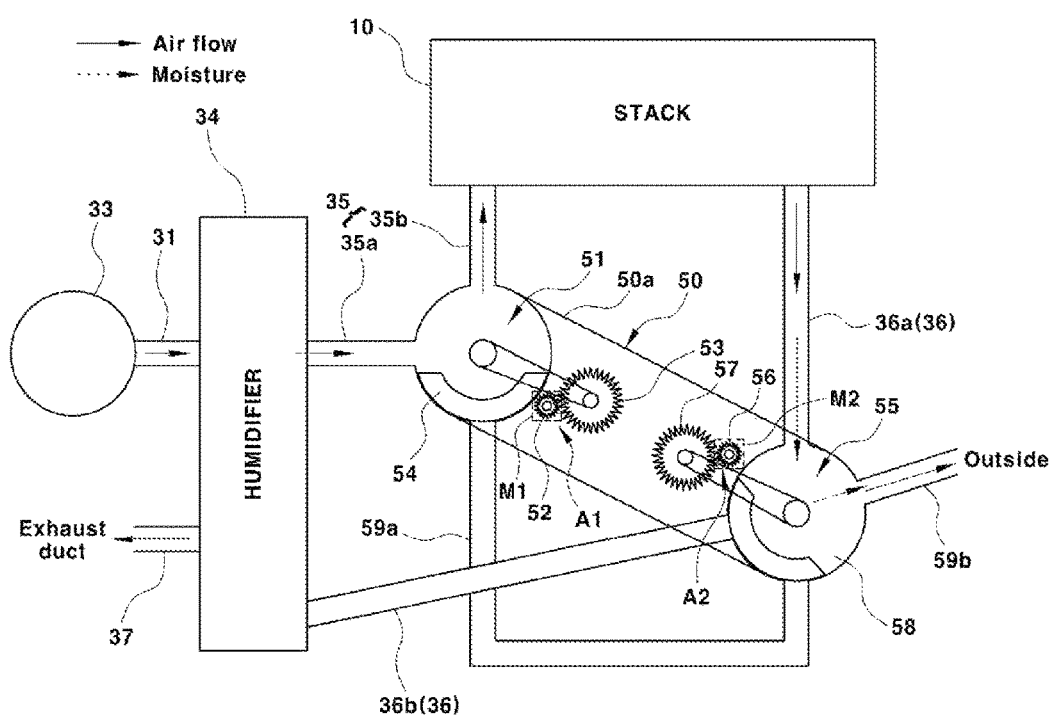

Referring to FIG. 7, in the humidifier bypass mode, the first valve 51 is controlled to open the first supply line 35a and second supply line 35b, while closing the bypass line 59a during the driving of the air blower 33 in accordance with a control signal from the controller.

The second valve 55 is controlled to open the first exhaust line 36a and outward discharge port 59b while closing the second exhaust line 36b and bypass line 59a in accordance with a control signal from the controller.

Accordingly, the air supplied through an air supply line 31 at the inlet side of the humidifier 34 by the air blower 33 is supplied to the cathode of the fuel cell stack 10 via the first supply line 35a, first valve 51, and second air supply line 35b after passing through the humidifier 34. Here, the supplied air is exhausted to the outside through the outward discharge port 59b together with the water present in the cathode of the fuel cell stack 10 and the first exhaust line 36a after passing through the second valve 55.

Thus, the water present in the cathode of the fuel cell stack 10 and the first exhaust line 36a is discharged to the outside together with the air from the cathode of the fuel cell stack 10 without passing through the humidifier 34. Therefore, it may be possible to effectively remove water present in the fuel cell stack 10 upon shutdown. As a result, a start-up time taken for a cold start may be reduced.

The above-described humidifier bypass mode control is executed for a predetermined time in an ON state of the air blower 33. After the predetermined time elapses, the unified valve module 50 is controlled to operate in the shutdown mode to complete shutdown of the fuel cell system.

As apparent from the above description, the fuel cell system according to the present disclosure satisfies GTRs throughout the operation range thereof and reduces fire risk, thereby securing safety In addition, since a minimal amount of air is present in the fuel cell stack after system shutdown (start-off), performance degradation and durability degradation of the fuel cell stack are reduced.

Furthermore, since the unified valve module interposed between the fuel cell stack and the humidifier functions as an air cutoff valve (ACV) to cut off the lines at the inlet and outlet-side of the cathode in the fuel cell stack, it may be possible to eliminate a conventional ACV. In particular, it may be possible to solve problems associated with freezing occurring in winter with the ACV which is mounted to an exhaust line at a downstream end side of the humidifier.

In addition, air and water from the fuel cell stack are discharged to the outside without passing through the humidifier upon shutdown in a low temperature environment. Thus, it may be possible to achieve effective removal of water from the fuel cell stack and to reduce the start-up time taken for the cold start of a vehicle.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell system comprising:
    an air supply unit for supplying air containing oxygen as an oxidizing gas to a fuel cell stack;
    a humidifier for humidifying the air supplied by the air supply unit;
    an air supply line connected between a cathode inlet of the fuel cell stack and the humidifier and supplying the humidified air to the fuel cell stack;
    a cathode-side exhaust line connected between a cathode outlet of the fuel cell stack and the humidifier and supplying a cathode exhaust gas discharged from a cathode of the fuel cell stack to the humidifier for humidification in the humidifier; and
    a unified valve module connected to the air supply line and the cathode-side exhaust line and comprising:
        a first valve installed at the air supply line;
        a second valve installed at the cathode-side exhaust line;
        a bypass line connected between the first valve and the second valve; and
        an outward discharge port connected to the second valve for discharging the cathode exhaust gas to outside,
    wherein the first valve selectively opens and closes a first supply line of the air supply line, which is connected to an outlet of the humidifier, and a second supply line of the air supply line, which is connected to the cathode inlet of the fuel cell stack and the bypass line,
    wherein the second valve selectively opens and closes a first exhaust line of the cathode-side exhaust line, which is connected to the cathode outlet of the fuel cell stack, and a second exhaust line of the cathode-side exhaust line, which is connected to an inlet of the humidifier, the bypass line, and the outward discharge port, and
    wherein the unified valve module controls a gas flow between the humidifier and the fuel cell stack and between the bypass line and the outward discharge port.

2. The fuel cell system of claim 1, wherein each of the first and second valves is an electromagnetic valve, an opening or closing operation of which is independently controlled in accordance with a control signal from a controller.

3. The fuel cell system of claim 1, wherein each of the first and second valves comprises:
    a valve housing, to which the first and second supply lines and the first and second exhaust lines are connected;
    a valve body installed in the valve housing and selectively opening and closing the first and second supply lines and the first and second exhaust lines connected to the valve housing in accordance with a rotational operation of the valve body; and
    valve actuators rotating the valve body in accordance with a control signal from a controller to selectively open and close the first and second supply lines and the first and second exhaust lines.

4. The fuel cell system of claim 3, wherein the first and second valves have an integrated valve structure in which the valve housings of the first and second valves are integrally connected.

5. The fuel cell system of claim 1, wherein the first exhaust line is connected to an anode-side exhaust line of the fuel cell stack at which a purge valve is installed to guide purged hydrogen to flow to the first exhaust line during opening of the purge valve.

6. The fuel cell system of claim 1, wherein, in a normal operation mode of the fuel cell system in which the air supplied by the air supply unit is supplied to the fuel cell stack after being humidified by the cathode exhaust gas in the humidifier, the first valve closes the bypass line while opening the first and second supply lines and the second valve closes the bypass line and the outward discharge port, under a condition that the air supply unit is driven.

7. The fuel cell system of claim 1, wherein, in a start-up mode in which start-up of the fuel cell system is executed, the first valve opens the first supply line, the second supply line, and the bypass line and the second valve closes the outward discharge port while opening the first exhaust line, the second exhaust line, and the bypass line under a condition that the air supply unit is driven, to discharge hydrogen present in the cathode of the fuel cell stack and the cathode-side exhaust line to the outside via the humidifier and an exhaust line connected to the outlet of the humidifier after being diluted with the air supplied by the air supply unit.

8. The fuel cell system of claim 7, wherein the start-up mode includes a first control operation mode and a second control operation mode to be executed after execution of the first control operation mode,
    wherein in the first control operation mode, the first valve closes the second supply line while opening the first supply line and the bypass line, and the second valve closes the first exhaust line and the outward discharge port while opening the second exhaust line and the bypass line, under a condition that the air supply unit is driven, and wherein in the second control operation mode, the first valve opens the first supply line, the second supply line, and the bypass line, and the second valve closes the outward discharge port while opening the first exhaust line, the second exhaust line, and the bypass line, under a condition that the air supply unit is driven.

9. The fuel cell system of claim 1, wherein, in a shutdown state of the fuel cell system, the first valve closes the second supply line and the second valve closes the first exhaust line.

10. The fuel cell system of claim 1, wherein, under a low temperature condition in which ambient temperature measured by a temperature sensor in a vehicle during shutdown of the fuel cell system is equal to or less a reference temperature, a humidifier bypass mode is executed in which the first valve closes the bypass line while opening the first supply line and the second supply line and the second valve closes the second exhaust line and the bypass line while opening first exhaust line and the outward discharge port, under a condition that the air supply unit is driven, to discharge the air supplied by the air supply unit to the outside through the outward discharge port while bypassing the humidifier after passing through the cathode of the fuel cell stack.

11. The fuel cell system of claim 10, wherein the humidifier bypass mode is executed for a predetermined period of time, and then, a shutdown mode is executed in which the first valve closes the second supply line, and the second valve closes the first exhaust line.

* * * * *